(12) United States Patent
Kirchmeyer et al.

(10) Patent No.: US 6,505,858 B1
(45) Date of Patent: Jan. 14, 2003

(54) METHODS AND APPARATUS FOR CUSTOMIZING CONFIGURABLE PHOTOCUBES

(76) Inventors: Wade H. Kirchmeyer, 5753G Santa Ana Canyon Rd., Suite 161, Anaheim Hills, CA (US) 92807; Mitesh G. Popat, 1233 Tamarisk Ave., Ridgecrest, CA (US) 93555

( * ) Notice: Subject to any disclaimer, the term of this patent is extended or adjusted under 35 U.S.C. 154(b) by 0 days.

(21) Appl. No.: 09/424,941

(22) PCT Filed: Apr. 2, 1999

(86) PCT No.: PCT/US99/07430

§ 371 (c)(1),
(2), (4) Date: Dec. 3, 1999

(87) PCT Pub. No.: WO99/51435

PCT Pub. Date: Oct. 14, 1999

Related U.S. Application Data

(60) Provisional application No. 60/080,732, filed on Apr. 3, 1998.

(51) Int. Cl.[7] ............................................. B42D 15/00
(52) U.S. Cl. ............................ 283/81; 283/61; 281/2; 281/5; 40/720
(58) Field of Search ........................... 283/61, 81, 62, 283/63.1, 48.1, 105; 281/2, 5, 15.1, 21.1; 40/720, 788, 325, 356; 273/157, 160; 428/195; 446/488

(56) References Cited

U.S. PATENT DOCUMENTS 4,854,060 A    8/1989  Corbo et al.
5,031,937 A  * 7/1991  Nellhans ..................... 283/48.1
5,090,733 A  * 2/1992  Bussiere ................. 283/105 X
5,829,790 A   11/1998  Phillips
6,029,383 A  * 2/2000  Zappitelli ..................... 40/720
6,117,061 A  * 9/2000  Popat et al. ................. 493/325
6,155,603 A  *12/2000  Fox ............................... 283/62
6,248,426 B1 * 6/2001  Olson et al. ................. 428/195

FOREIGN PATENT DOCUMENTS

| | | |
|---|---|---|
| DE | 7105400 | 7/1971 |
| FR | 2231297 A | 12/1974 |
| FR | 2349182 A | 11/1977 |
| FR | 2496943 A1 | 6/1982 |
| US | 3561146 A | 2/1971 |
| WO | WO97/02949 A1 | 1/1997 |
| WO | WO97/32784 A3 | 9/1997 |
| WO | WO97/32784 A2 | 9/1997 |

* cited by examiner

Primary Examiner—Willmon Fridie, Jr.
(74) Attorney, Agent, or Firm—Eric K. Satermo

(57) ABSTRACT

A customizable configurable photocube system includes a photocube and a label sheet. The photocube has a plurality of blocks each having a plurality of sides. The label sheet has a plurality of labels that are attachable to corresponding sides of the blocks. The label sheet is configured to be printed upon in a commonly used office printing machine such as an inkjet printer or a color copier. A user may print a number of images onto the label sheet, thereafter removing the labels from the label sheet and attaching the labels to sides of the blocks in such a manner that a configurable photocube is formed.

18 Claims, 18 Drawing Sheets

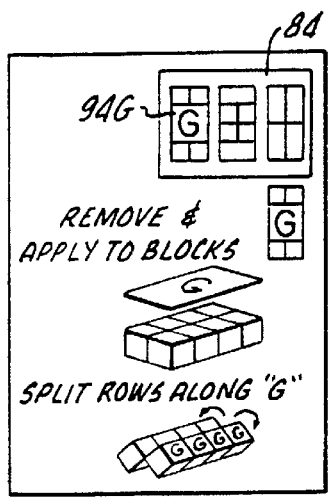
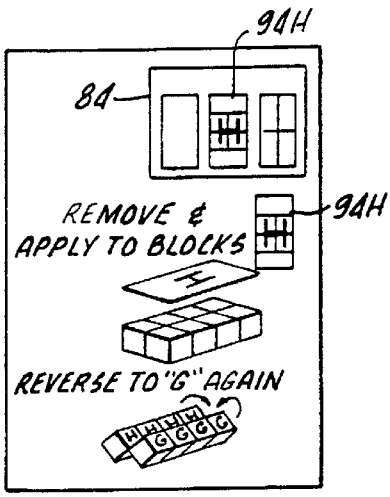
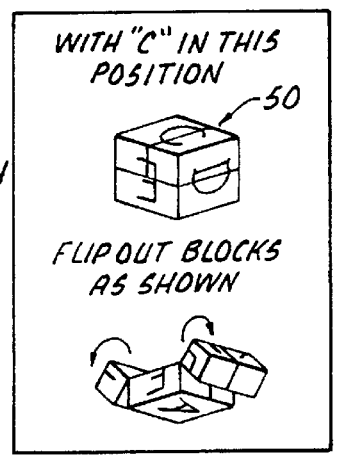
FIG. 13J.   FIG. 13K.   FIG. 13L.
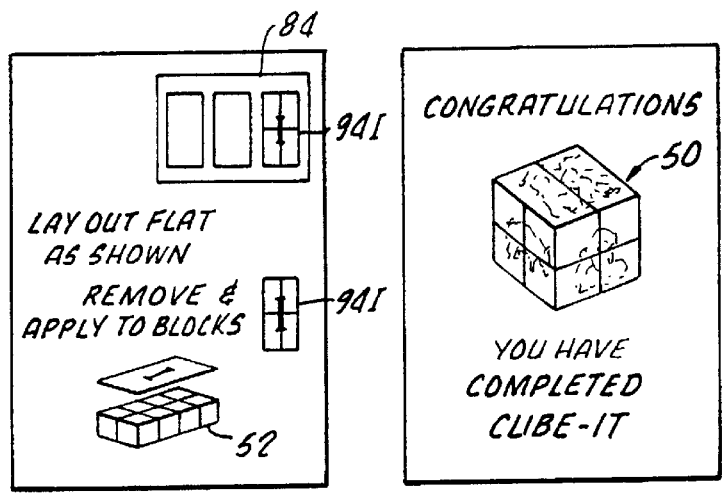
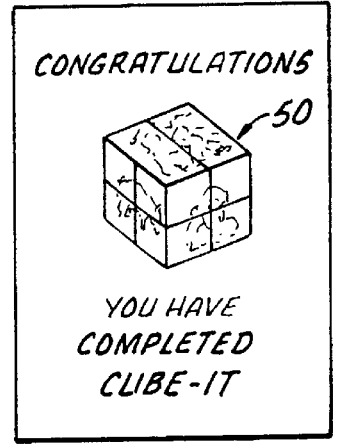
FIG. 13M.   FIG. 13N.

METHODS AND APPARATUS FOR CUSTOMIZING CONFIGURABLE PHOTOCUBES

This application claims the benefit of provisional application 60/080,732 filed Apr. 3, 1998.

FIELD OF THE INVENTION

The present invention relates to photocubes and to computer systems and, more particularly, to computer systems which print images for application to multifaceted photocubes.

BACKGROUND OF THE INVENTION

Photocubes are commonly used to display pictures or other images. One common photocube is made of clear plastic has six sides, with each side displaying a photograph. The photographs are typically retained in place by being compressed between one side and a back support. The photocube is configured so that the photographs are replaceable.

Also known in the art are configurable photocubes. These devices have eight cubical blocks each having six sides. The blocks are attached so that the photocube is foldable into a number of configurations. Images are fixed to the sides of the blocks. The display of the images may be changed depending upon how the photocube is folded. These photocubes have been used as promotional items, with the images displaying, for example, an athlete or a product.

One of the drawbacks of conventional photocubes is that the images are permanently fixed to the cube. Accordingly, a user cannot remove or replace the images. In addition, a user cannot display images of his or her own selection. Another drawback is that the images are produced using a process known as "offset printing." Offset printing is a commercial printing process that entails the use of films, plates, drums, ink rollers, etc. Accordingly, although producing professional images, offset printing is priced out of reach of everyday users. In addition, even in commercial printing, offset printing is intended for high-volume printing jobs.

In view of the foregoing, there remains a need in the art for a photocube that allows a user to self-embellish or customize the images displayed by the photocube and to change the images displayed by photocube as desired.

SUMMARY OF THE INVENTION

The present invention provides methods and apparatus that allow a user to customize a configurable photocube with images of his or her own selection by using common office printing machines, such as inkjet printers and color copiers. The present invention also provides methods and apparatus that allows a user to change an image or images currently displayed by a configurable photocube with another image or images.

According to one aspect of the invention, a customizable configurable photocube system includes a plurality of blocks and a label sheet. Each of the blocks has a plurality of sides. The label sheet is configured to be printed upon in a commonly used office printing machine, such as a printer connected to a computer or a photocopier. A plurality of computer-readable instructions in the form of computer software may be stored on a computer-readable medium such as a floppy disc to configure the computer to print images on the label sheet in a desired manner. The label sheet has at least one label that is attachable to one of the sides of two of the blocks so that the blocks are pivotal with respect to each other.

One of the advantages of the present invention is that a user can print a selected image on the label, or a selection of images on a plurality of labels, and then apply the label to the blocks to form a configurable photocube. For example, a digitized image can be loaded onto to a computer and displayed on the monitor. The computer may display a graphical user interface on the monitor that corresponds to the label sheet. A user may then assign the image to the label by using the interface device, which may be a mouse, and the graphical user interface. As the label sheet preferable has a plurality of labels each of which corresponds to one of the sides of the blocks, a user can load a plurality of images such as digitized photographs, onto the computer and then assign the images to particular labels. The images may then be printed onto the labels. The labels may then be applied to corresponding sides of the blocks to form a photocube to display the images. Accordingly, a user is able to customize or self-embellish the photocube with images of his or her own selection.

Other aspects, features, and advantages of the present invention will become apparent to those skilled in the art from a consideration of the following detailed description taken in conjunction with the accompanying drawings.

DETAILED DESCRIPTION OF THE INVENTION

Figure 1:
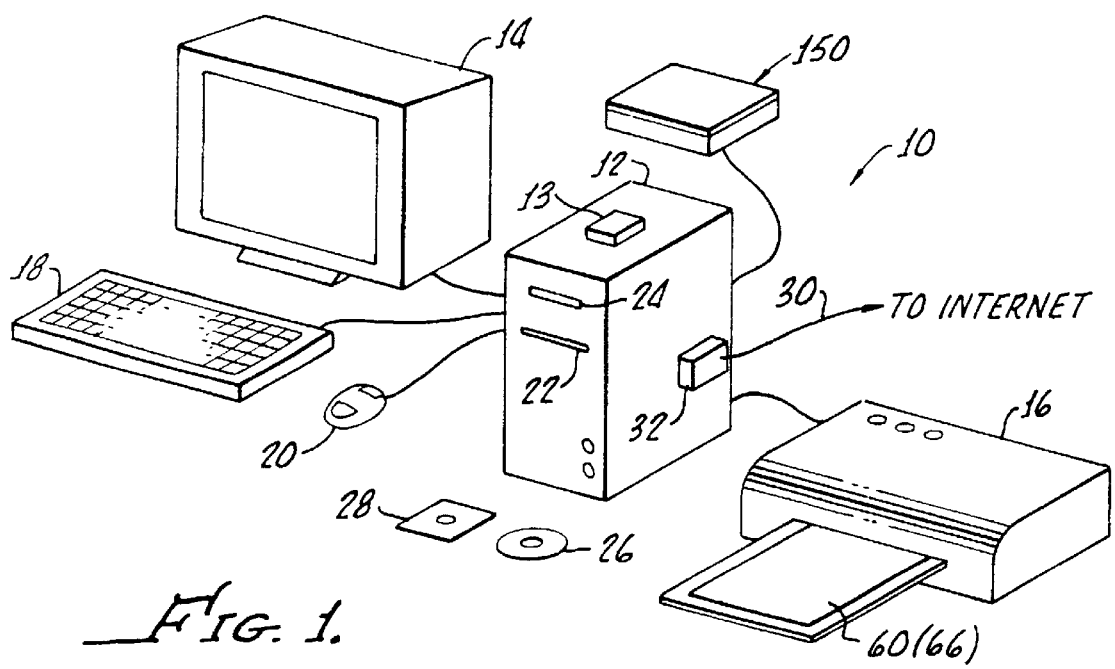
FIG. 1 is a perspective view of an exemplary computer system configured in accordance with the present invention.

Referring more particularly to the drawings, an exemplary computer system 10 configured in accordance with the teachings of the present invention is illustrated in FIG. 1. System 10 includes a computer 12 with a processor 13, a monitor 14, and an office printing machine such as a printer 16. Interface devices such as a keyboard 18 and a mouse 20 allow a user to interact with the system. Instructions in the form of computer code may be downloaded into computer 12 by a compact disc read-only memory (CD-ROM) drive 22 or a floppy drive 24 for respectively receiving a complementary computer-readable storage medium such as a CD-ROM 26 or a floppy disc 28. Alternatively, computer code may be downloaded into computer 12 through an Internet connection 30 as known in the art. In addition, computer 12 may include a hard disc 32 on which computer code may be prestored or "bundled." The plurality of computer-readable instructions cause the processor 13 to operate the system 10 in accordance with the methodology of the invention, which is discussed in detail below.

Figure 2:
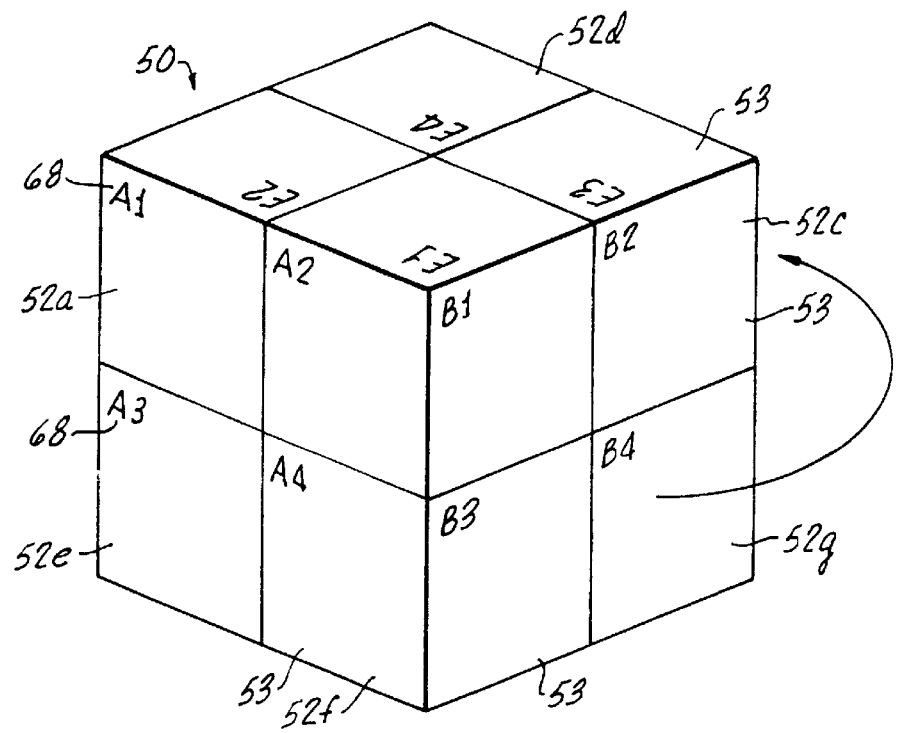
FIG. 2 is a perspective view of an exemplary photocube of the present invention taken from a first perspective.
Figure 3:
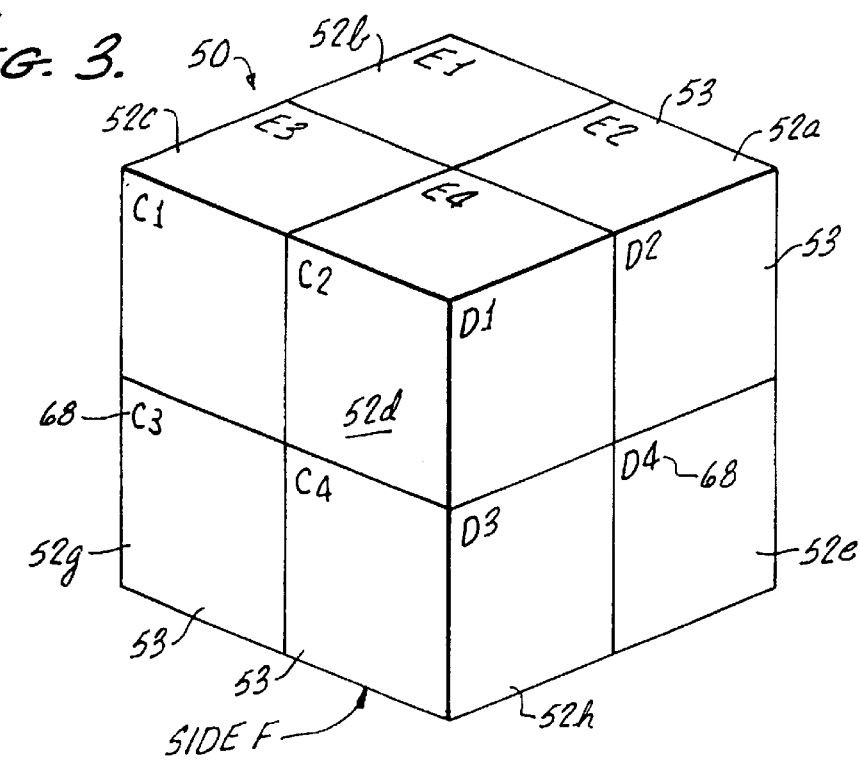
FIG. 3 is a perspective view of the photocube taken from a second perspective (rotated 180 degrees from that of FIG. 2)

A photocube 50 in accordance with an exemplary embodiment of the present invention is shown in FIGS. 2 and 3. Photocube 50 consists of eight blocks 52a, 52b, 52c, ... 52h, each of which has six sides 53. (For the purposes of this description, analogous elements are generally referenced with a numeral, e.g., block 52, and specifically reference with an alpha suffix, e.g., block 52a.) Although alternative configurations are possible, each of the blocks 52 is preferably a cube.

Figure 4A:
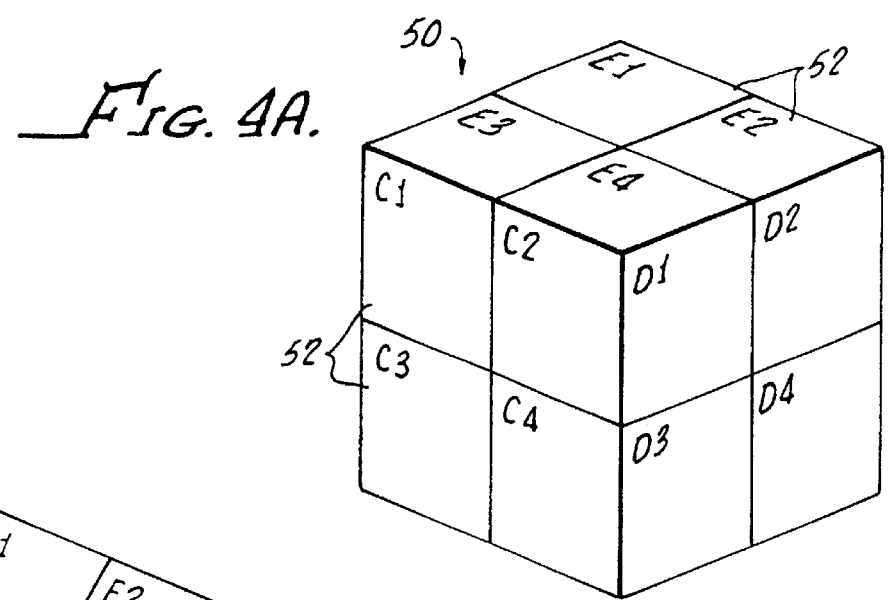
FIGS. 4A through 4I are perspective views of the photocube respectively illustrating progressive steps in configuring the cube.
Figure 4B:
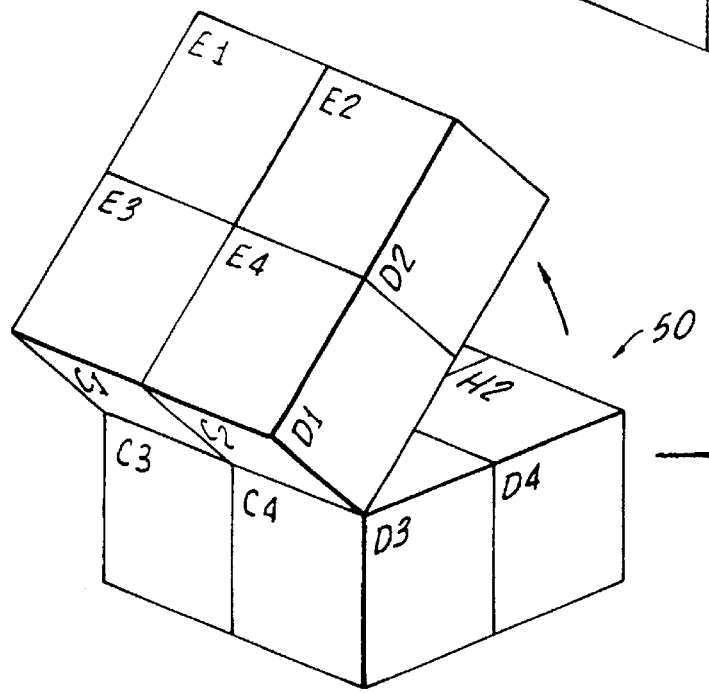
Figure 4C:
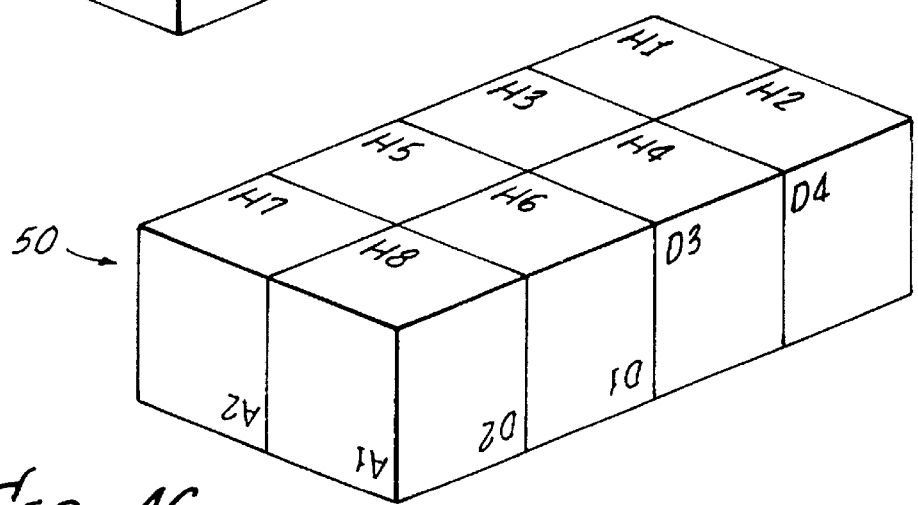
Figure 4D:
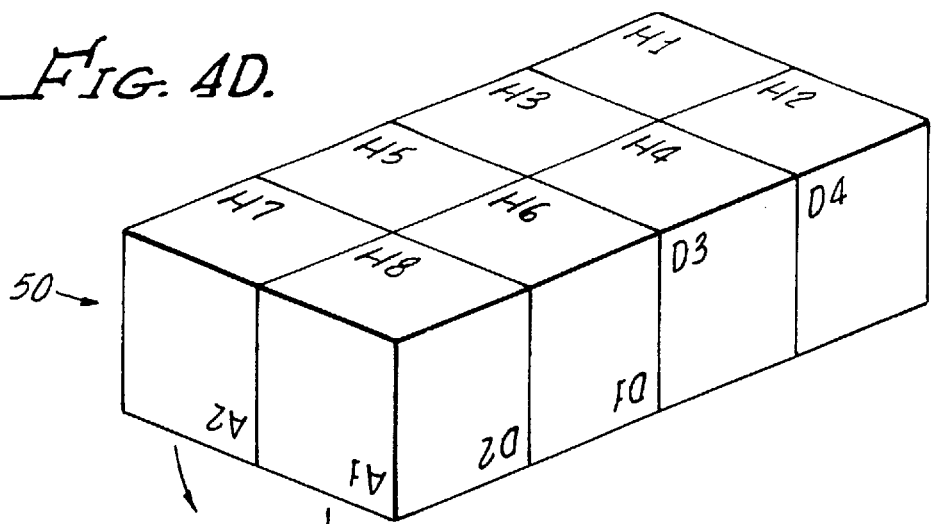
Figure 4E:
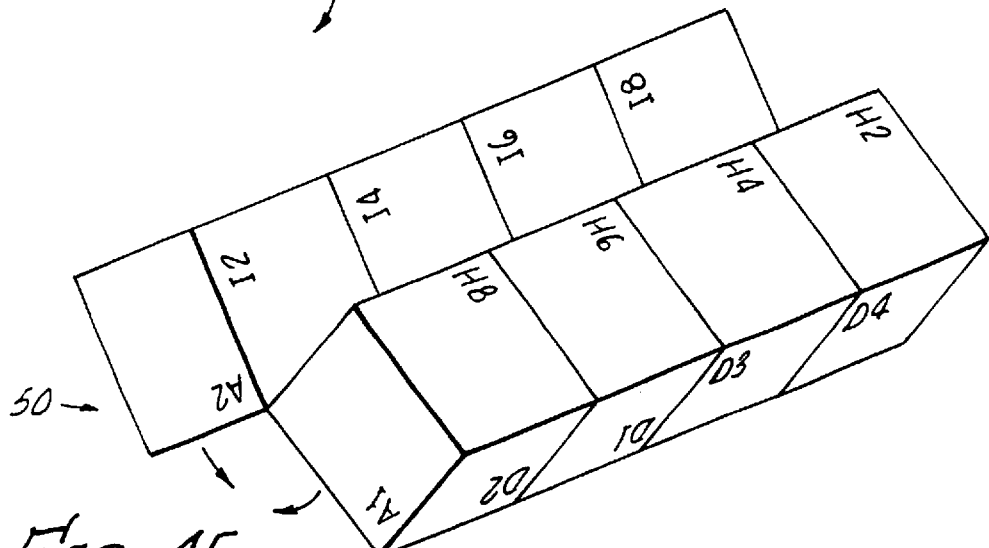
Figure 4F:
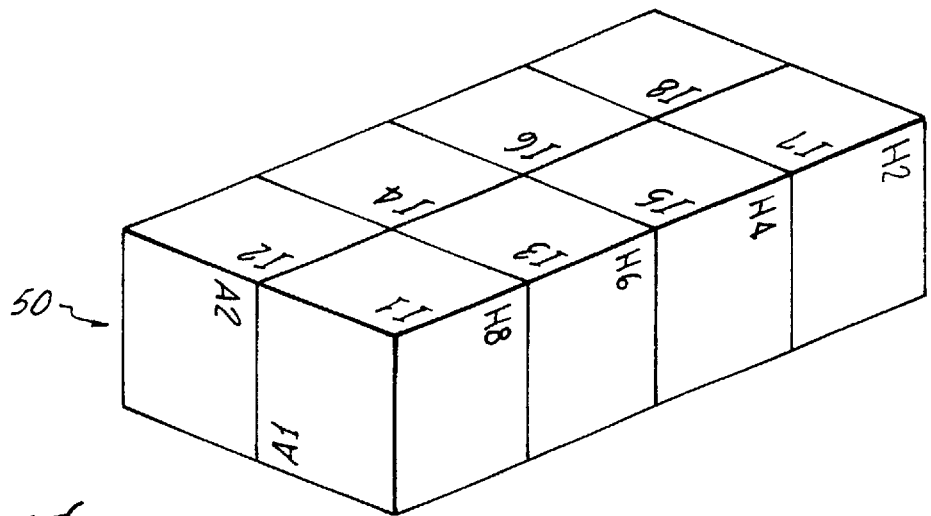
Figure 4G:
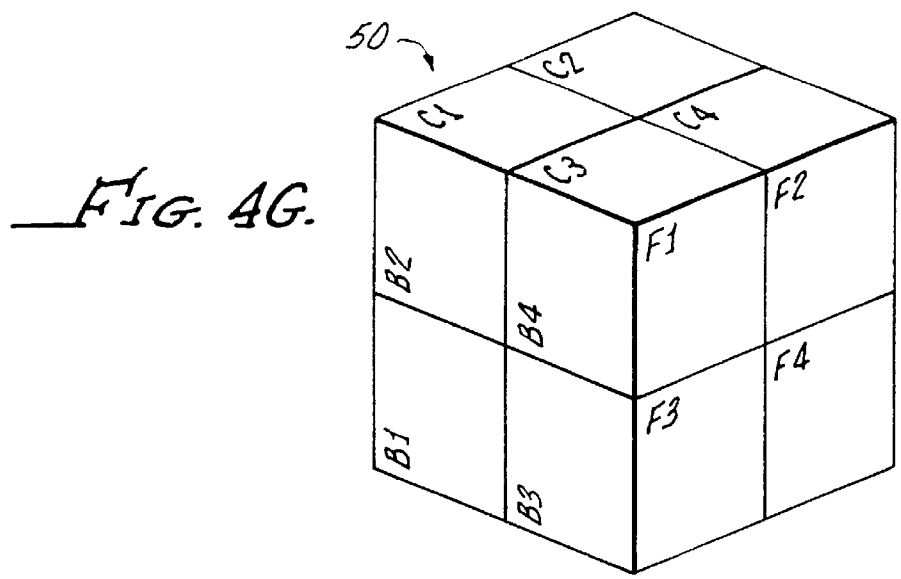
Figure 4H:
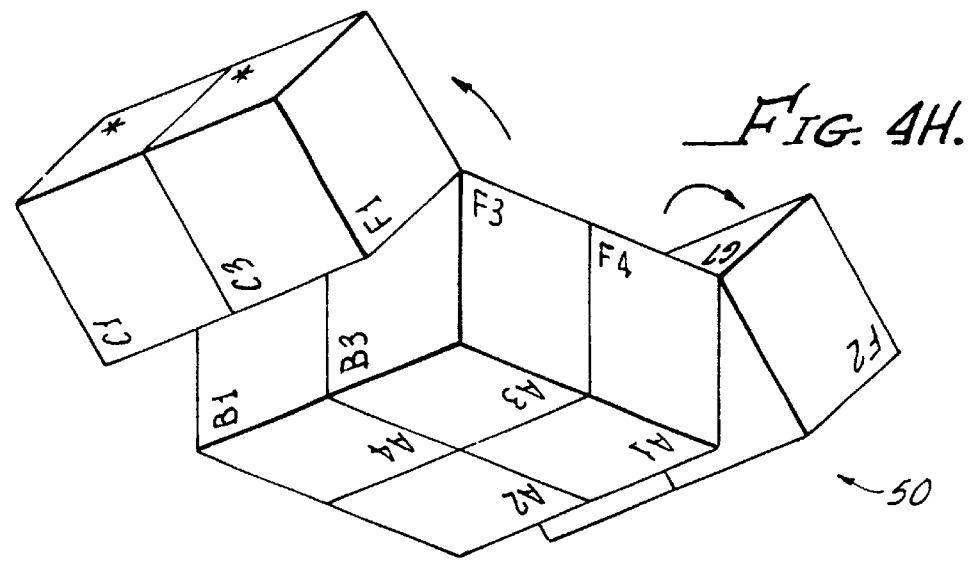
Figure 4I:
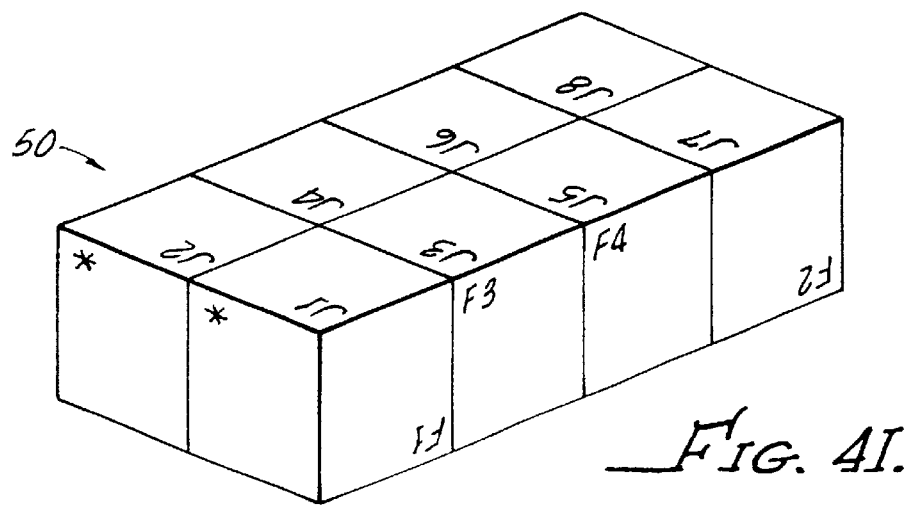

With additional reference to FIGS. 4A through 4I, blocks 52 are attached so that cube 50 is "foldable" or configurable in a plurality of configurations. For example, photocube 50 may initially take the form of a regular cube as shown in FIG. 4A. Two-by-two halves of cube 50 may be rotated as shown by the arrows in FIG. 4B to yield a panoramic slab as shown in FIG. 4C. From the slab-like configuration shown in FIGS. 4C and 4D, one-by-four halves of cube 50 may be rotated as shown by the arrows in FIG. 4E to yield another panoramic slab as shown in FIG. 4F. Alternatively, from a regular cube configuration shown in FIG. 4G, one-by-two quarters of photocube 50 may be rotated as shown by the arrows in FIG. 4H to yield yet another panoramic slab-like configuration as shown in FIG. 4I. As will be discussed in detail below, labels may be applied to photocube 50 to yield mosaics of images such as photographs. Each individual user may customize or self-embellish the photocube in any desired manner.

Figure 5A:
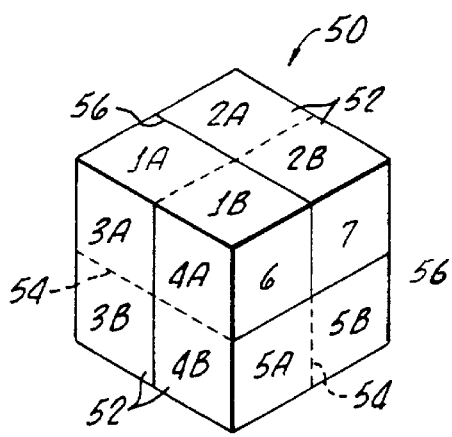
FIGS. 5A through 5M are perspective views of a configurable photocube in accordance with an exemplary embodiment of the present invention, with each of the figures illustrating a progressive step in respective configurations of the photocube, particularly beginning from a top side of the photocube.
Figure 6A:
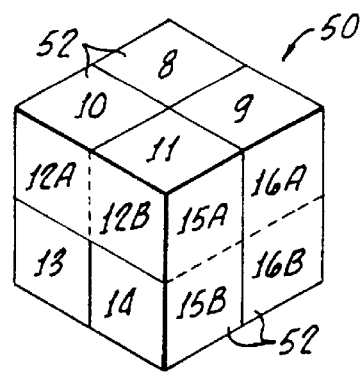
FIGS. 6A through 6M are perspective views similar to those of FIGS. 5A–5M, with each of the figures illustrating a progressive step in respective configurations of the photocube, particularly beginning from a bottom side of the photocube.

FIGS. 5A–5M and 6A–6M illustrate an alternative configuration sequence of photocube 50. FIGS. 5A–5M illustrate a continuous sequence of configurations of photocube 50, starting from a regular cube shown in FIG. 5A and ending with the same regular cube shown in FIG. 5M. Similarly, FIGS. 5A–5M illustrate a continuous sequence of configurations of photocube 50, starting from a regular cube shown in FIG. 6A, which is an inverted perspective of the regular cube shown in FIG. 5A, and ending with the same regular cube shown in FIG. 6M.

As mentioned above, blocks 52 are connected in such a way so that cube 50 is configurable as shown in the drawings. In accordance with a preferred embodiment of the invention, labels are adhered to the blocks 52 so that every block 52 is attached to two other blocks 52 along non-adjacent edges which are orthogonal with respect to each other. (The labels will be discussed in detail below.) Referencing FIG. 5A, edges of the blocks 52 which are attached to adjacent blocks are indicated by dotted lines in the drawings and referenced with numeral 54, and edges of the blocks 52 which are not attached to adjacent blocks are indicated by solid lines and referenced with numeral 56. Attached edges 54 form joints or act as hinges between adjacent blocks, allowing the blocks to rotate with respect to each other. The orthogonal and non-adjacent edges 54 are illustrated in, for example, FIG. 6B, in which block 52a is attached to block 52b along common edge 54a and to block 52e along common edge 54b. As can be seen, edges 54a and 54b are orthogonal but not adjacent to each other.

Figure 5B:
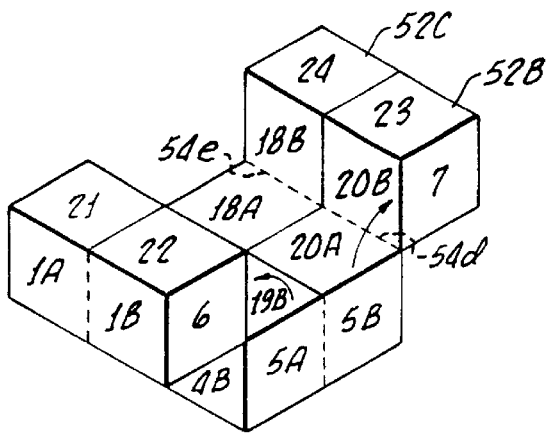
Figure 6B:
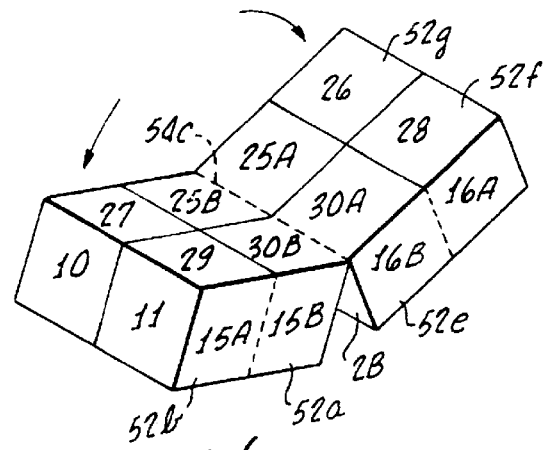
Figure 5C:
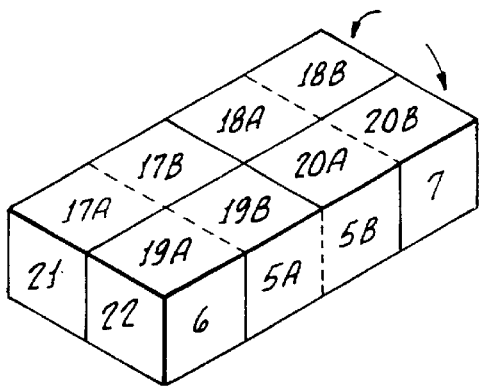
Figure 6C:
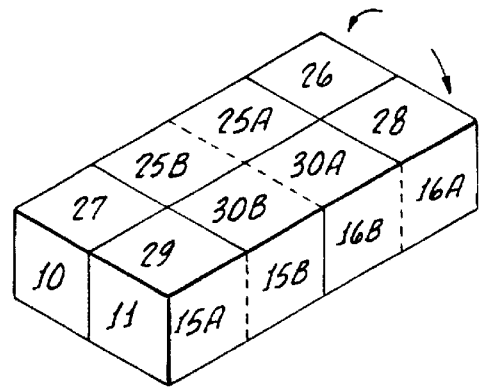
Figure 5D:
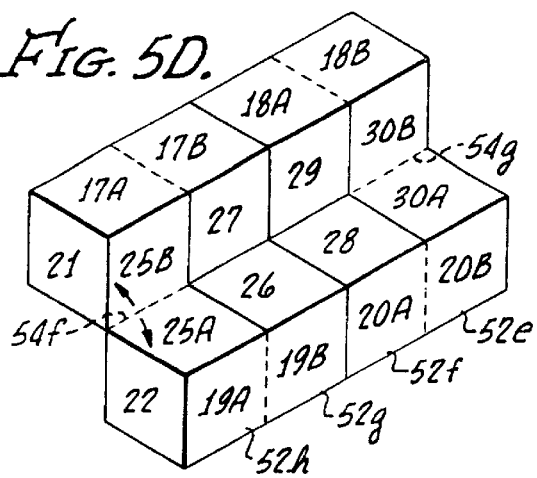
Figure 6D:
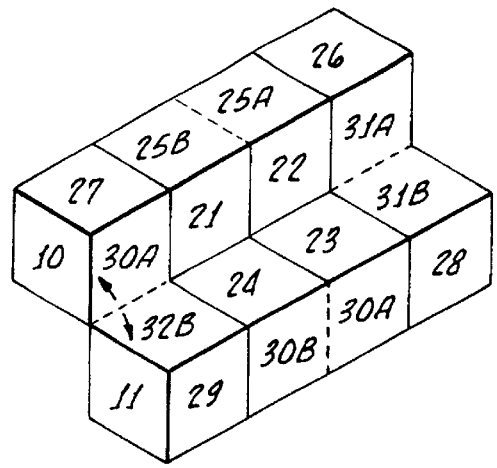
Figure 5E:
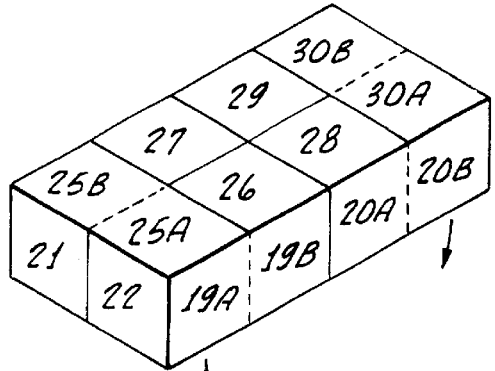
Figure 6E:
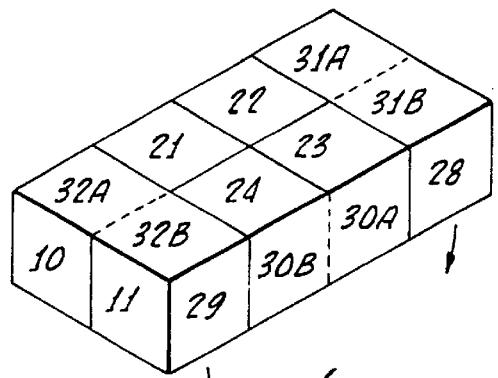
Figure 5F:
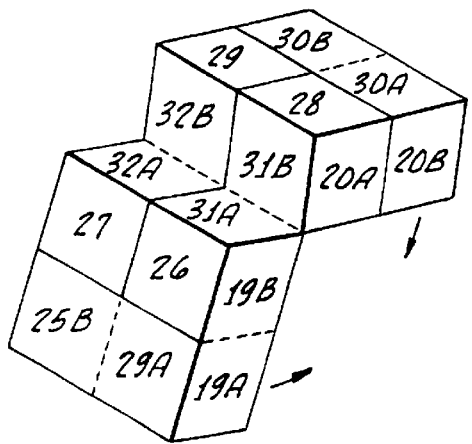
Figure 6F:
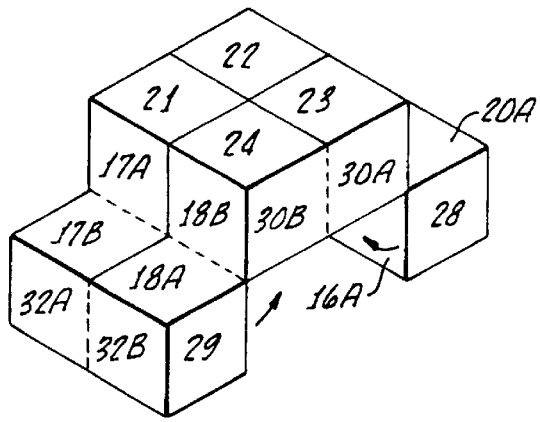
Figure 5G:
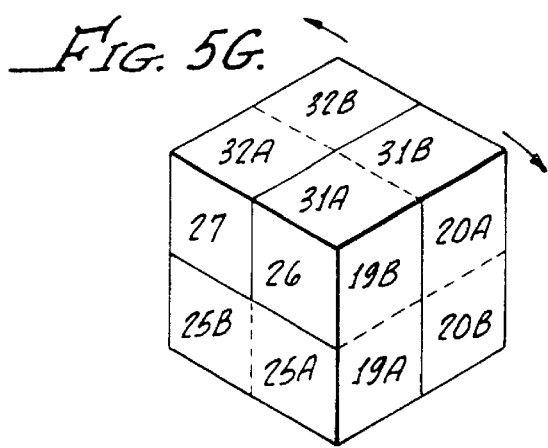
Figure 6G:
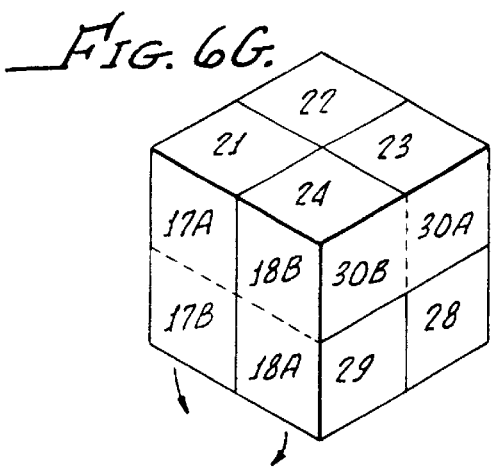
Figure 5H:
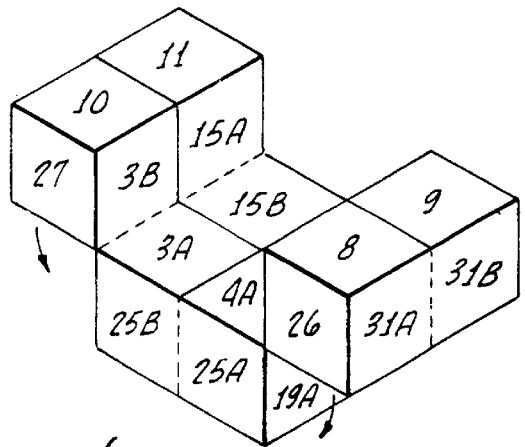
Figure 6H:
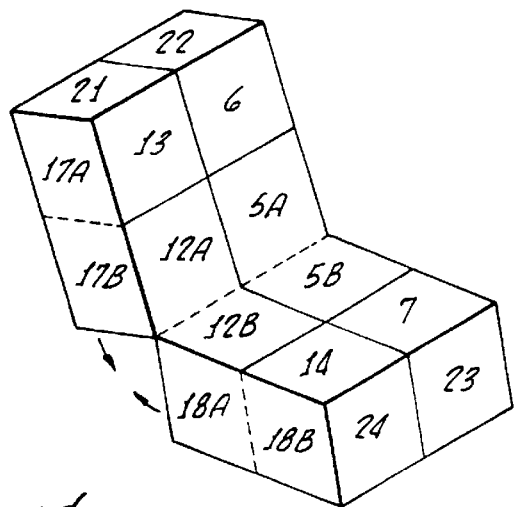
Figure 5I:
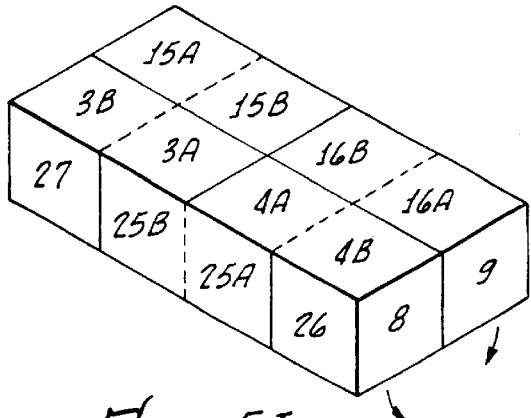
Figure 6I:
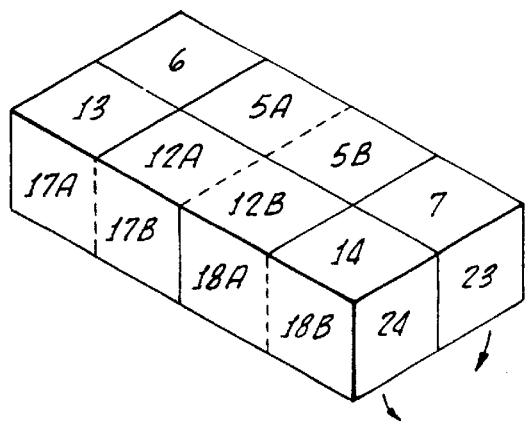
Figure 5J:
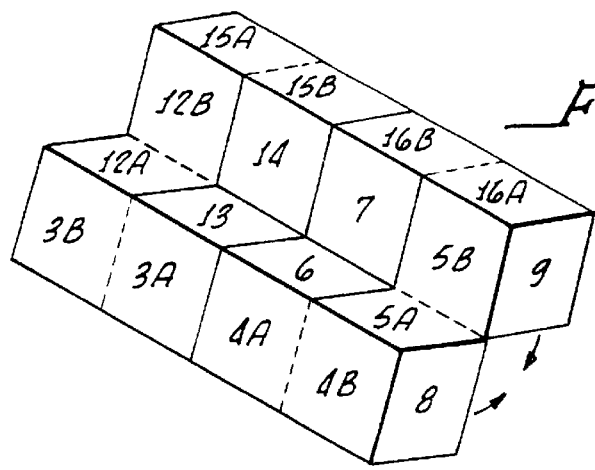
Figure 6J:
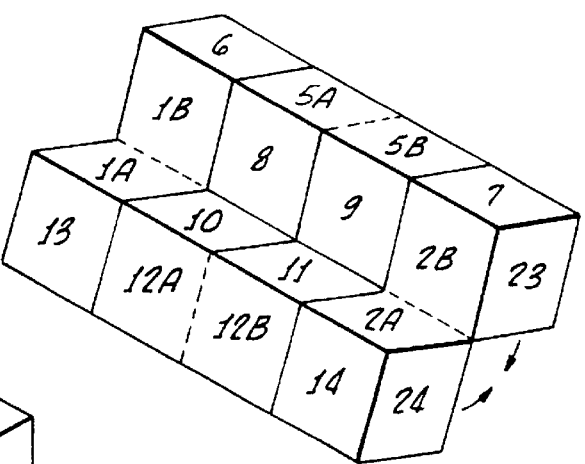
Figure 5K:
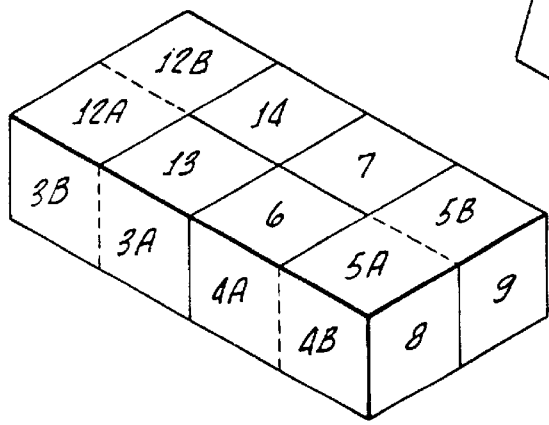
Figure 6K:
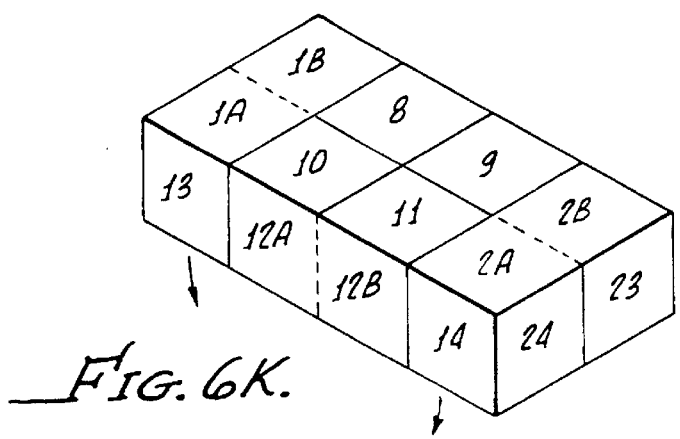
Figure 5L:
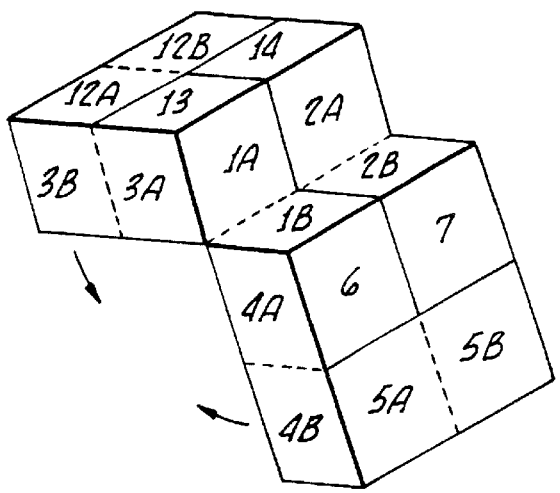
Figure 6L:
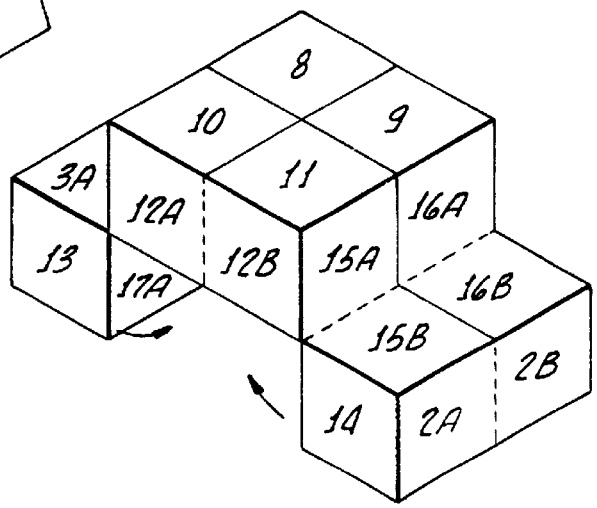
Figure 5M:
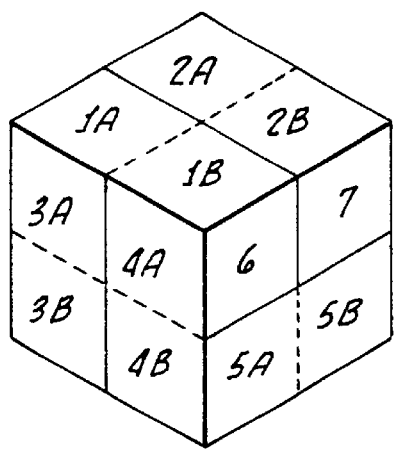
Figure 6M:
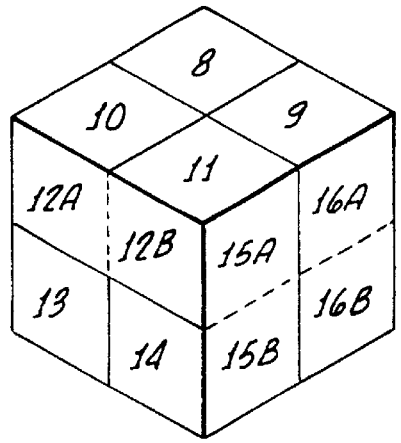

As illustrated in FIGS. 5 and 6, exemplary photocube 50 may change configurations by rotating either one-by-two quarters as shown in FIGS. 5B, 6F, 5H, and 6L; two-by-two halves as shown in FIGS. 6B, 5F, 6H, and 5L; or one-by-four halves as shown in FIGS. 5D, 6D, 5J, and 6J. In order for the quarters or halves to rotate, two attached edges or joints 52 need to be coaxial. For example, as shown in FIG. 5B, edge joints 54d and 54e are coaxial, allowing the one-by-two quarter consisting of blocks 52b and 52c to rotate. In addition, as shown in FIG. 6B, edge joints 54b and 54c are coaxial, allowing the two-by-two half consisting of blocks 52e–52h to rotate. Finally, as shown in FIG. 5D, edge joints 54f and 54g are coaxial, allowing the one-by-four half consisting of blocks 52e–52h to rotate.

Figure 7:
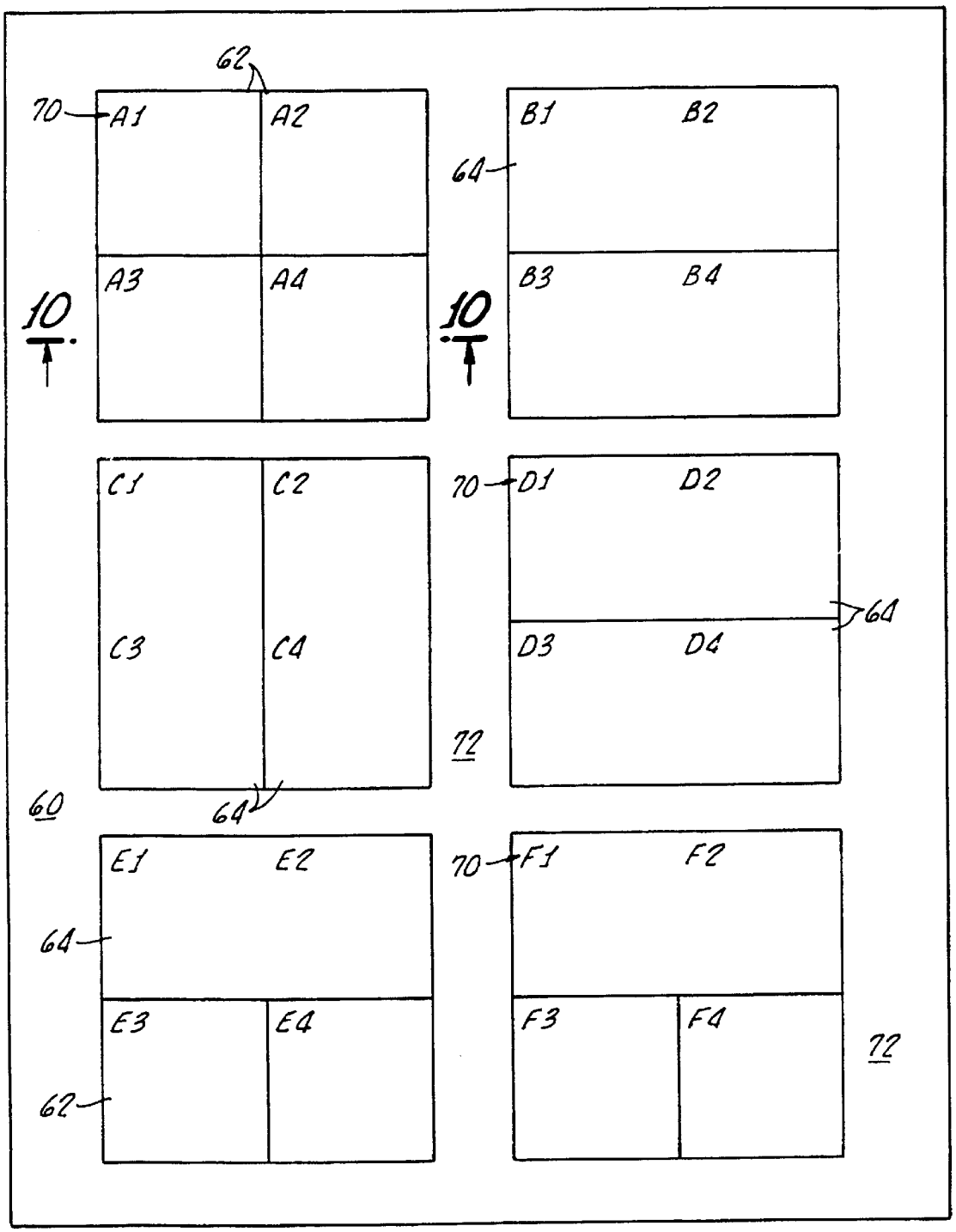
FIG. 7 is a plan view of an exemplary label sheet including a plurality of adherent labels for self-embellishing the photocube of the present invention, particularly illustrating labels which may be applied to the cube in accordance with that shown in FIGS. 2, 3, and 4G.
Figure 8:
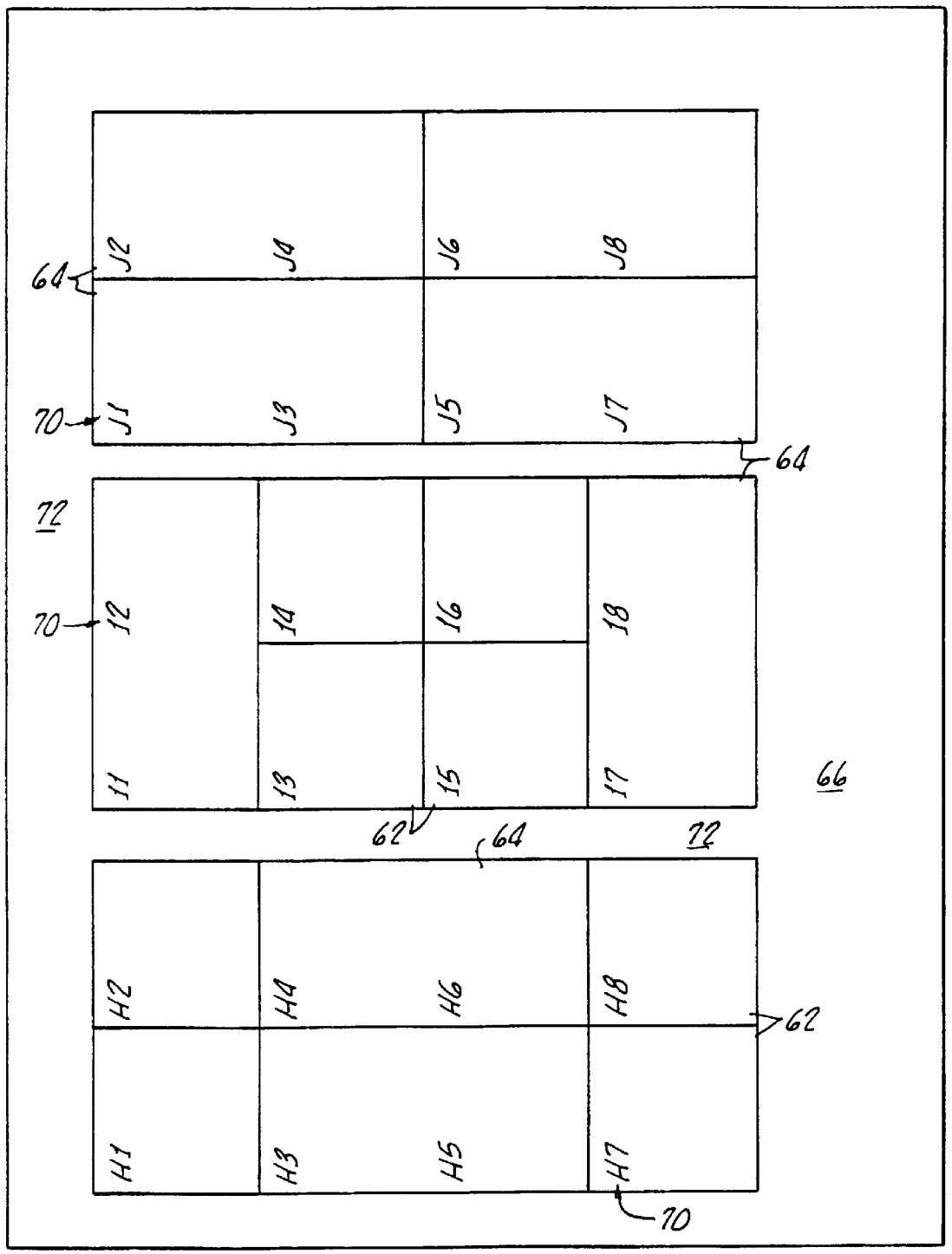
FIG. 8 is a plan view of an exemplary label sheet including a plurality of adherent labels for self-embellishing the configurable photocube of the invention, particularly illustrating labels which may be applied to the cube in accordance with FIGS. 4I, 4D, and 4F.

Referring to FIG. 7, an exemplary label sheet 60 configured in accordance with the present invention is illustrated. Label sheet 60 may include a plurality of single labels 62 and a plurality of double labels 64. Each of the single labels 62 is attachable to one side 53 of a single block 52. Each of the double labels 64 is attachable to one side 53 of each of two adjacent blocks 52, thereby forming an edge joint 54. Another exemplary label sheet 66 is illustrated in FIG. 8 and also includes single labels 62 and double labels 64. Rather than having the double labels 64 serve as joints, the blocks 52 may be rotatably connected together with hinges, either conventional hinges or living hinges. Alternatively, the blocks 52 may be connected together with a thin flexible material so as to be rotatable.

With additional reference to FIG. 1, by providing the two label sheets 60 and 66 as shown in FIGS. 7 and 8, a user may print images on the labels 62 and 64 and then apply the labels to photocube 50. The labels 62 and 64 may be applied to the cube in accordance with indicia (i.e., A1, A2, A3, A4, B1, . . . J8) which correspond to labels 62 and 64 shown in FIGS. 7 and 8 and respective sides 53 of the blocks 52 shown in FIGS. 2, 3, and 4. Cube indicia 68 may be printed on each side 53 of each block 52 of the photocube 50 and corresponding label indicia 70 may be printed on each label 62 and 64 as shown or in margins 72 of the label sheet 60 (or 66) adjacent to the labels.

When labels 62 and 64 are applied in this manner, images printed on individual labels may form a mosaic of a larger image. For example, computer 12 is configurable by software to allow a user to print an image on single labels 62 with indicia A1–A4 of label sheet 60, with each label A1–A4 having a quarter portion of the entire image printed thereon. When labels A1–A4 are applied to photocube 50 as shown in FIG. 2, the entire "A" side of the cube will display the entire image consisting of four single labels. Similarly, computer 12 is configurable to print an image on double labels 64 with indicia J1–J8 of label sheet 66, with each double label having a quarter portion of the entire image printed thereon. When labels J1–J8 are applied to photocube 50 in accordance with that shown in FIG. 4I, the entire "J" side of the slab-configured cube will display a panoramic image consisting of four double labels (or a total of eight single labels).

Figure 9A:
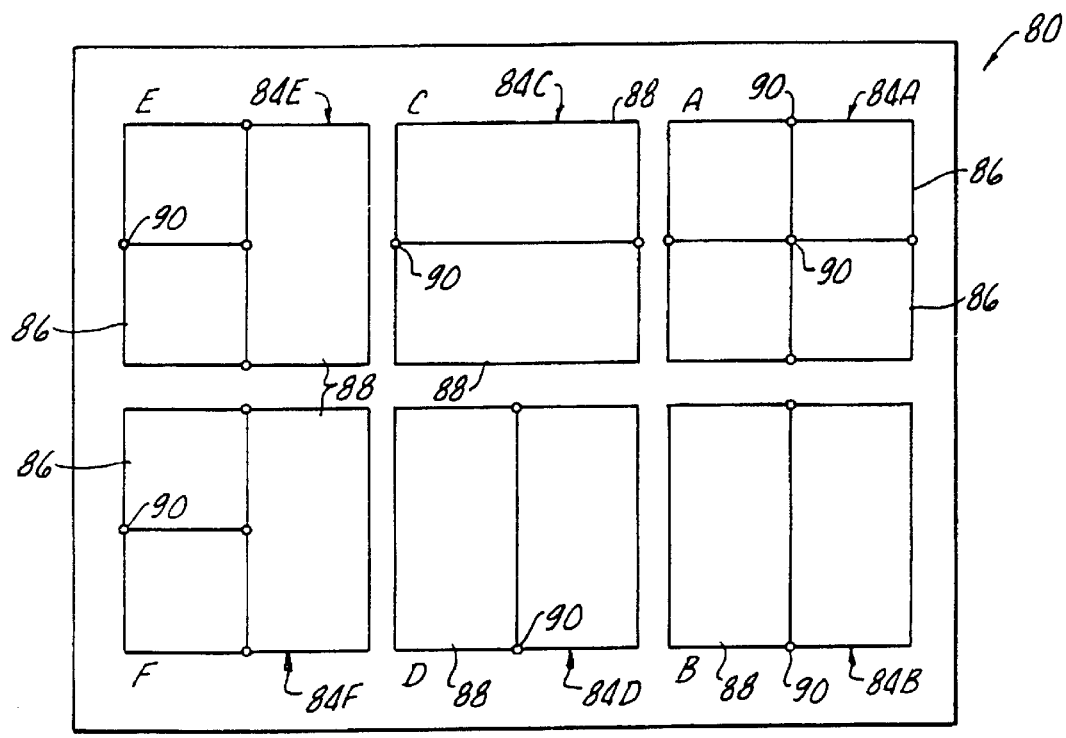
FIG. 9A is a plan view of an exemplary embodiment of a 6-panel label sheet of the invention.
Figure 9B:
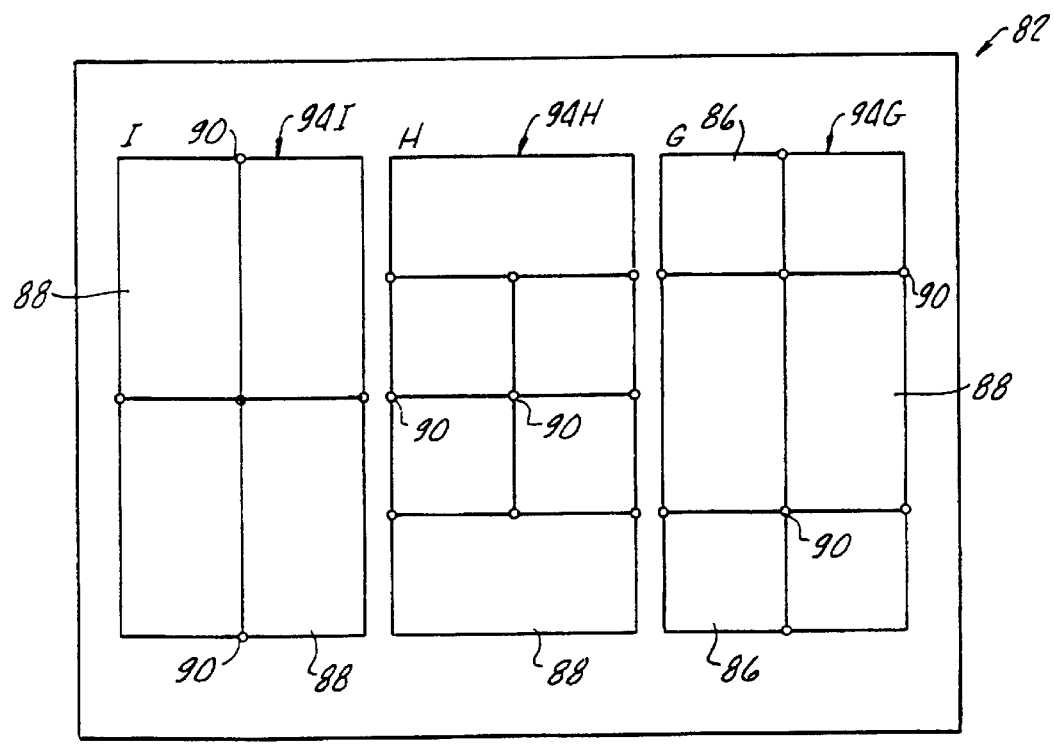
FIG. 9B is a plan view of an exemplary embodiment of a 3-panel label sheet of the invention.

Referencing FIGS. 9A and 9B, exemplary embodiments of a pair of label sheets 80 and 82 configured for customizing a photocube consisting of eight blocks, where each of the blocks are cubes having approximate dimensions of, for example, 1.5 inches by 1.5 inches. As mentioned above, the blocks may be either preconnected or connected together as discussed below. Although any size sheet may be used such as A4, legal, and so on, exemplary label sheets 80 and 82 are dimensioned as 8½ inches by 11 inches for facilitating use in common office printing machines.

Label sheet 80 shown in FIG. 9A includes six label panels 84 each labeled with an alpha A, B, C, D, E, and F, respectively. Label sheet 80 may therefore be considered a 6-panel sheet. Each of the label panels 84 is divided into a plurality of labels, either single labels 86 or double labels 88. Similarly, label sheet 82 shown in FIG. 9B includes three label panels 94 each labeled with an alpha G, H, and I, respectively. Label sheet 82 may therefore be considered a 3-panel sheet. Each of the label panels 94 is divided into a plurality of labels, either single labels 86 or double labels 88. The labels 86 and 88 may be formed by, for example, die cutting. It is preferable for the labels of each label panel 84 or 94 to be connected by breakable ties 90 so that each panel 84 or 94 of labels 86 and/or 88 may be collectively removed from the label sheet 80 or 82. The labels 86 and 88 may be formed by, for example, die cutting.

As respectively shown in FIGS. 9A and 9B, each of the panels 84 of label sheet 80 is substantially square, and each of the panel 94 of label sheet 82 is substantially rectangular. Each of the single labels 86 has dimensions allowing a single label to substantially cover an entire side 53 of one of the blocks 52, and with each of the double labels 88 has dimensions allowing a double label to substantially cover an entire side 53 of two of the blocks 52.

Figure 10:
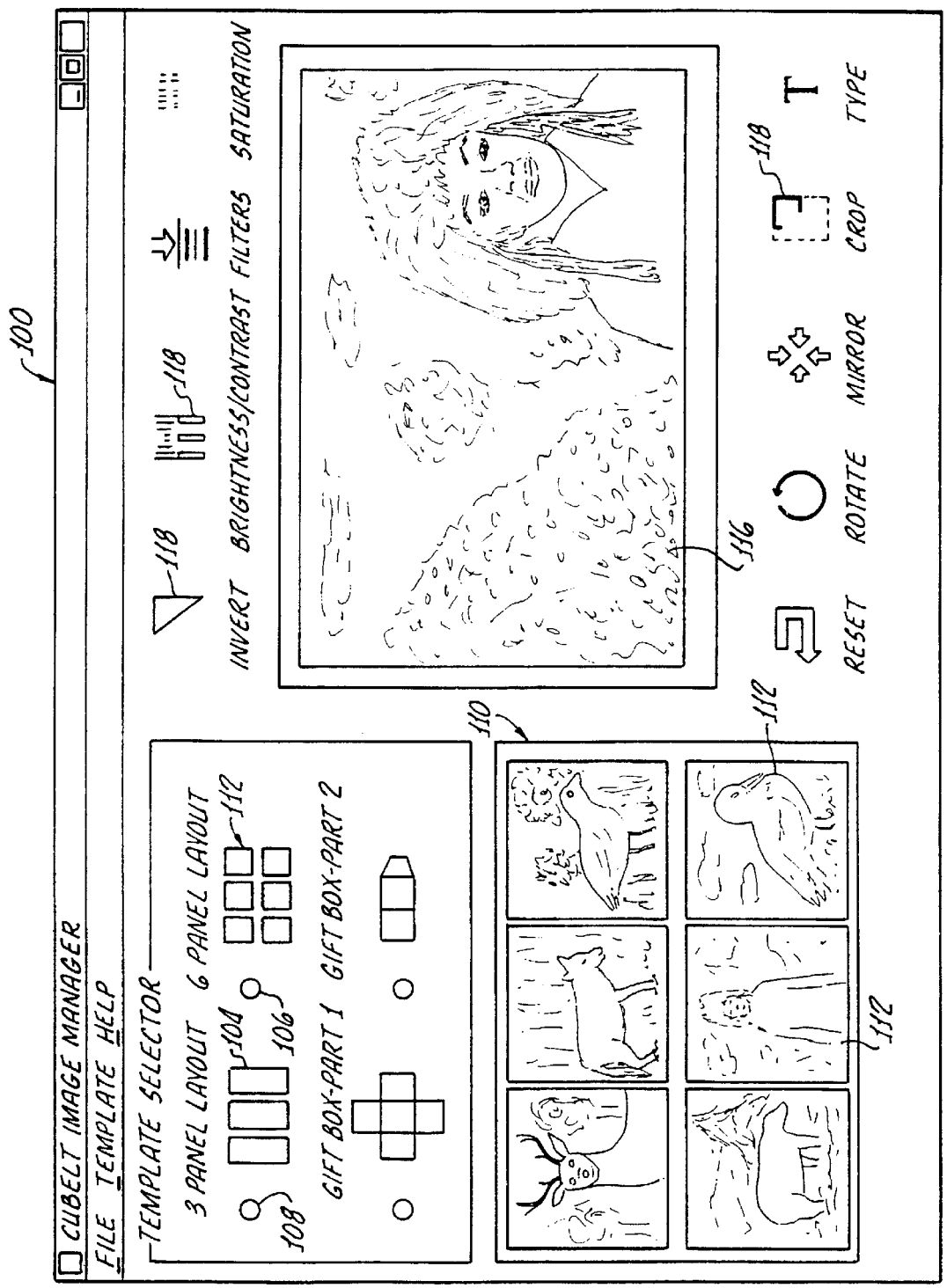
FIG. 10 is a schematic view of a monitor displaying a digitized image and a graphical user interface in accordance with the invention.

With additional reference to FIG. 10, computer 12 may be configured to display on the monitor 14 a graphical user interface (GUI) 100. The GUI 100 contains a plurality of template icons 102 and 104 that respectively correspond to the label panels 84 and 94 of label sheets 80 and 82. As shown in the drawing, a selection icon 106 corresponding to the 6-panel template 102 is selected, while a selection icon 108 corresponding to the 3-panel template 104 is not. As template 102 is selected, a template window 110 corresponding to label sheet 80 is displayed on the monitor 14. The template window 110 includes a plurality of panel fields 112 respectively corresponding to label panels 84 of label sheet 80. A 3-panel template window corresponding to label sheet 82 may be displayed with selection icon 108 is selected, which 3-panel template window may include a plurality of panel fields corresponding to label panels 94 of label sheet 82.

At least one image window 114 may also be displayed on the monitor 14 in which a digitized image 116 is displayed. By utilizing the GUI 100 and one or both of the interface devices 18 and 20, a user may assign the image 116 or a portion of the image to one of the panel fields 112. For example, images may be selected with the graphical pointer (not shown) of the mouse 20 and then dragged (as known in the art) to a particular panel field 112. Alternatively, an image may be cut and pasted (as known in the art) onto a panel field 112 corresponding to a particular label field 84 or 94. As shown in FIG. 10, each of the panel fields 112 has an image assigned thereto. The GUI 100 may also include a plurality of function keys 118 with which a user may modified the image 116.

After a desired selection of images 116 are assigned to the panel fields 112, the label sheet corresponding to the selected template field (in this example, label sheet 80) may be loaded into an office printing machine such as the printer 16, and the computer 12 may be activated to print. According to the present invention, the images assigned to the panel fields 112 are printed on corresponding label fields 84 of the label sheet 80. Analogously but not shown in the drawings, images assigned to panel fields corresponding to label fields 94 of label sheet 82 are printed on label fields 94. After printing, the label panels 84 and 94 may be removed from the label sheets 80 and 82 and applied to the blocks 52, which is discussed in detail below.

Figure 11:
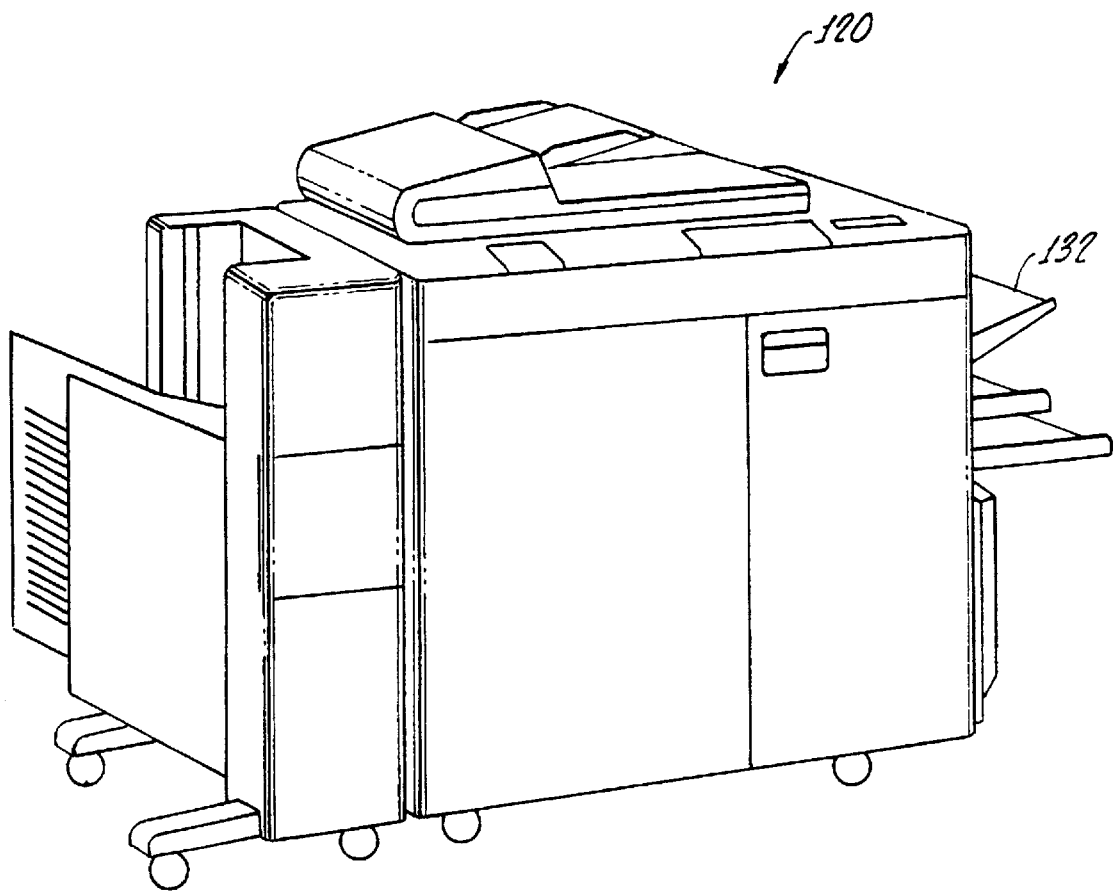
FIG. 11 is a perspective view of a color copier for printing images on label sheets of the invention.
Figure 12A:
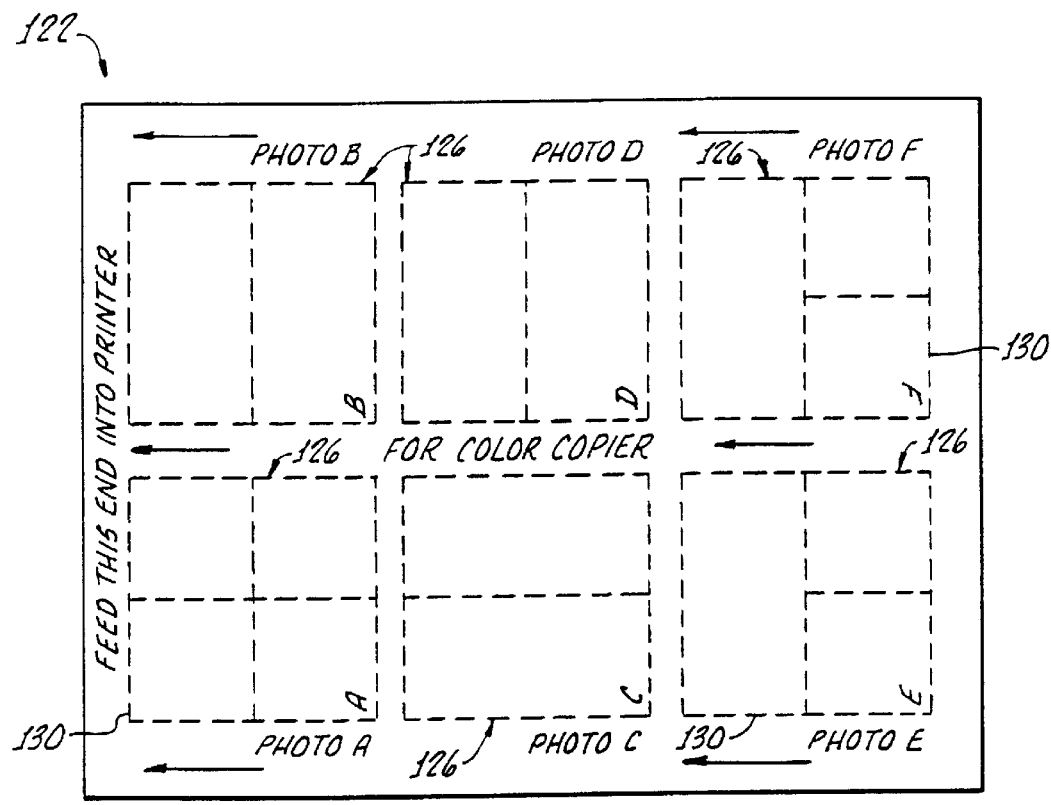
FIG. 12A is a plan view of a template sheet for use in printing images on the label sheet shown in FIG. 9A in a color copier according to the invention.
Figure 12B:
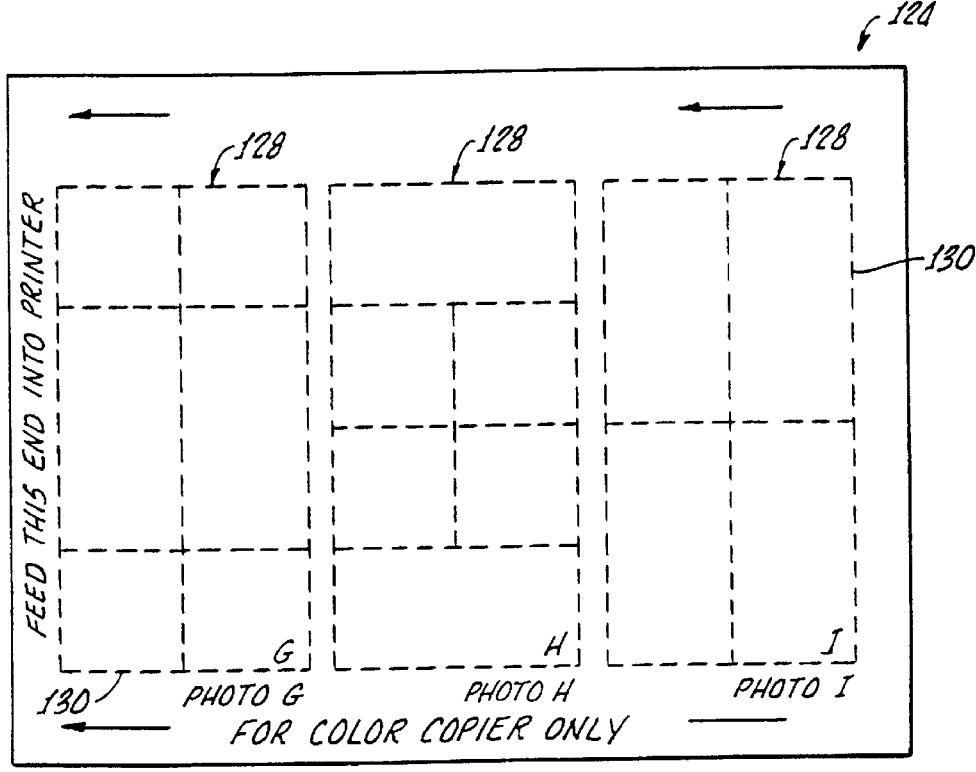
FIG. 12B is a plan view of a template sheet for use in printing images on the label sheet shown in FIG. 9B in a color copier according to the invention.

According to another exemplary embodiment of the present invention, rather than utilizing a computerized printing system as shown in FIG. 1 to print on the label sheets 80 and 82, a color copier 120 as shown in FIG. 11 may be used as the office printing machine. Referencing FIGS. 12A and 12B, the system of the present invention may also include a 6-panel template sheet 122 corresponding to label sheet 80 and a 3-panel template sheet 124 corresponding to label sheet 82. The template sheets 122 and 124 are substantially the same size as the corresponding label sheets 80 and 82. The 6-panel template sheet 122 includes a plurality of panel matrices 126 each corresponding in spatial position to a respective label panel 84 of label sheet 80. Similarly, the 3-panel template sheet 124 includes a plurality of panel matrices 128 each corresponding to a respective label panel 94 of label sheet 82. Each of the matrices 126 and 128 may have an alpha index (e.g., A, B, C, etc.) corresponding to that of the label sheets 80 and 82.

To print on the label sheets 80 and 82 with a copier 120, a user may attached imaged such as photographs to the template sheets 122 and 124, using the matrices 126 and 128 as guides. The preprinted images such as photographs may be attached to the template sheets 122 and 124 using, for example, adhesive, tape, glue, and so on. Alternatively, each matrix 126 and 128 may be perforated, as indicated by numeral 130, and removed. A user may then attached, for example, a photograph to the back side of the template sheets 122 and 124, with the remaining frame of the matrix forming a frame around the photograph. In either case, after the images are attached, one of the template sheets, e.g., template sheet 122, may be positioned on the copier 120 as known. The label sheet corresponding to the positioned template sheet, e.g., label sheet 80, may be loaded in a feed tray 132 of the copier 120. The copier 120 may then be activated to copy as known. According to the invention, images attached to the panel matrices 126 of the 6-panel template sheet 122 are printed on corresponding label panels 84 of label sheet 80, and images attached to the panel matrices 128 of the 3-panel template sheet 126 are printed on corresponding label panels 94 of label sheet 82.

Figure 13A:
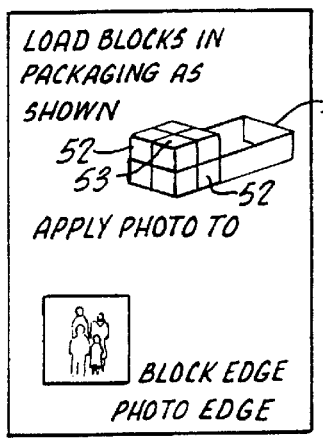
FIGS. 13A to 13N are diagrammatic view illustrating subsequent steps in configuring a plurality of blocks into a configurable photocube in accordance with the invention.
Figure 13B:
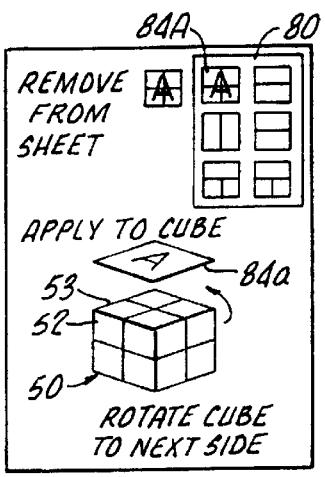
Figure 13C:
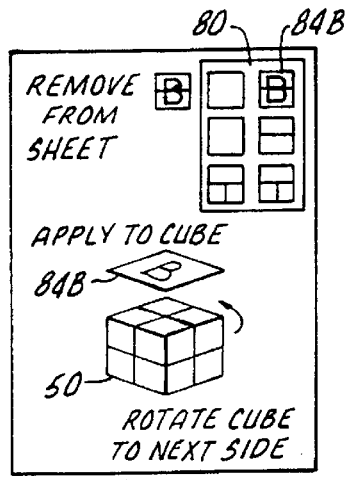
Figure 13D:
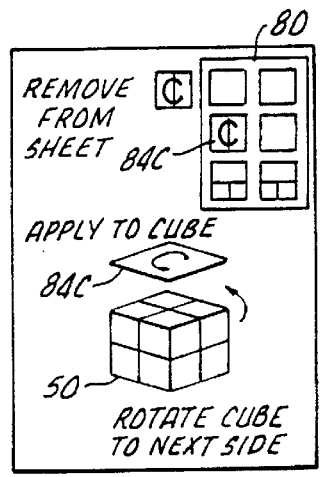
Figure 13E:
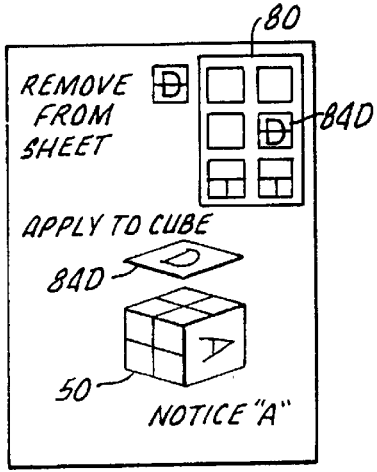

After the label sheets 80 and 82 have been printed upon according to the methodology described above, the label panels 84 and 94 may be attached to the blocks 52. With reference to FIGS. 13A to 13N, the individual block 52 may be stacked in a cube or loaded into a tray 140 as shown in FIG. 13A. Label panel 84A may then be removed from label sheet 80 and attached to one facet of the cube 50 consisting of a set of four coplanar sides 53 of four blocks 52, as shown in FIG. 13B. The plurality of blocks 52 may then be rotated 90 degrees, and label panel 84B may then be removed and attached to another facet of the cube 50 consisting of four coplanar sides 53 of four blocks 52, as shown in FIG. 13C. The plurality of blocks 52 may then be rotated another 90 degrees, and label panel 84C may be removed from label sheet 80 and attached to yet another facet of the cube 50 consisting of four coplanar sides 53 of four blocks 52, as shown in FIG. 13D. The plurality of blocks 52 may then be rotated yet another 90 degrees, and label panel 84D may be removed from label sheet 80 and attached to still another facet of the cube 50 consisting of four coplanar sides 53 of four blocks 52, as shown in FIG. 13E.

Figure 13F:
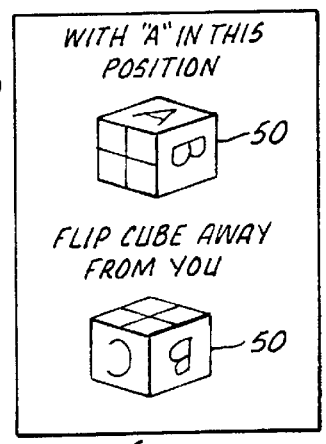
Figure 13G:
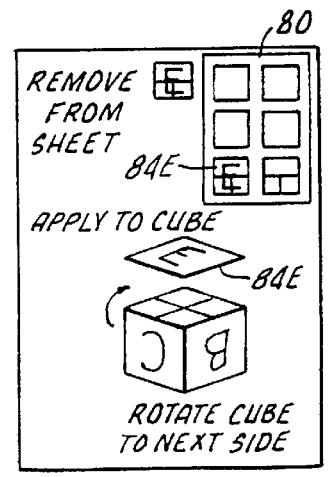
Figure 13H:
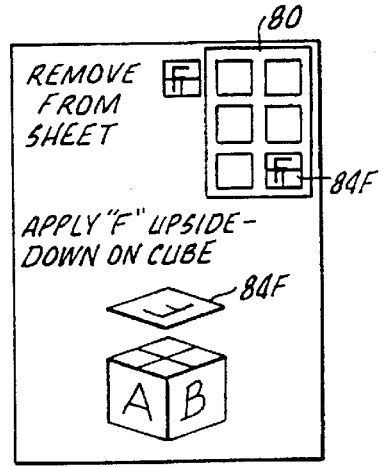
Figure 13I:
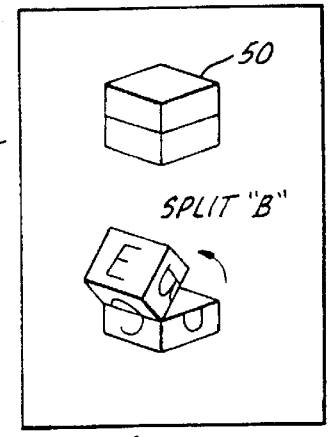

As shown in FIG. 13F, the plurality of blocks 52 may be rotated 90 degrees as shown, to exposed another facet of the cube 50. Label panel 84E may be removed from label sheet 80 and attached to the open facet of the cube 50, as shown in FIG. 13G. The plurality of blocks 52 may then be rotated again to expose the last of the six facets of the cube 50, and label panel 84F may be removed from label sheet 80 and attached to the facet, as shown in FIG. 13H. At this stage in the customization of the photocube 50, each of the label panels 84 of label sheet 80 have been attached to the blocks 52, as shown in FIG. 13I. The photocube 50 is then pivoted in half such that double labels 88 of label panel 84B are separated. That is, a user urges the photocube to open along the die cut separating double labels 88 of label panel 84B, with ties 90 breaking to allow such pivotal movement, as shown in FIG. 13I. The plurality of blocks 52 is now a 2-by-4 slab as discussed above.

As shown in FIG. 13J, label panel 94G may be removed from label sheet 84 and applied to the facet consisting of eight coplanar sides 53 of eight blocks 52. The slab of blocks 52 may then be pivoted as shown, breaking the ties 90 along the longitudinal die cut of label panel 94G, thereby exposing another 2-by-4 facet. Label panel 94H may then be removed from label sheet 84 and attached to the facet, as shown in FIG. 13K. The plurality of blocks 52 may then be folded in reverse order to the position shown in FIG. 13L, and then rotated to break the ties 90 along the die cut between double labels 88 of label panel 83C, thereby resulting in another 2-by-4 facet. As shown in FIG. 13M, label panel 94I may then be removed from label sheet 82 and adhered to the remaining exposed sides 53 of the blocks 52. As shown in FIG. 13N, the plurality of blocks 52 are now customized with images printed on commonly used office printing machines and attached together to be foldable in a plurality of configurations as discussed above.

With further reference to FIG. 1, images may be loaded onto the system 10 through the Internet connection 30 or through storage media 26 and 28. Alternatively, a scanner 150 may be connected to the system 10 to digitize and load images onto the system. Digitized images may also be provided by a digital camera or a digital videocassette recorder (VCR) as known in the art. Further, images from a digital camera stored on storage device may be printed by a complementary digital printer directly onto label sheets of the invention that are configured to be printed upon by such an office printing machine.

Figure 14A:
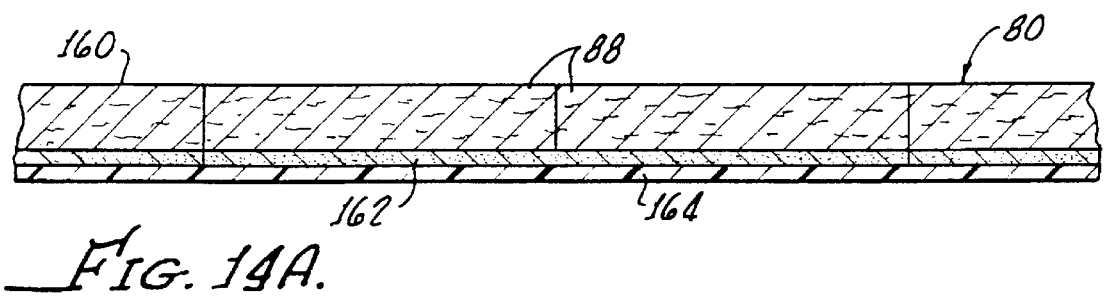
FIG. 14A is a cross-sectional view of a label sheet taken along line 14—14 of FIG. 9A, illustrating an exemplary embodiment of a label sheet.

With reference to FIG. 14A, each of the label sheets 80 and 82 may include a printing sheet 160 which is die cut into the labels 86 and 88, a layer of adhesive 162, and a backing sheet 164 with a release coating adjacent the adhesive 162. The adhesive 162 may be a permanent adhesive or a pressure-sensitive adhesive. Examples of label sheets that may be printed upon for high-quality images are produced by Avery Dennison™ Corporation as Color Copier Label Nos. 7701–7708 with uncoated, matte, gloss, or polyfast finishes.

According to the exemplary embodiment in which the adhesive 162 is pressure-sensitive adhesive, after the being printed upon and applied to the photocube 50, the labels 86 and 88 may be removed from the photocube, and labels with newly printed images may be applied. Accordingly, a user may regularly change the images on the photocube 50 with new images. Accordingly, the label sheets 80 and 82 of the invention may be configured so that the labels 86 and 88 are removable from (or removably attachable to) the photocube 50.

As mentioned, a color copier such as that shown in FIG. 11 may be used to print images on the label sheets. An example of such a copier is a Xerox® Docucolor 40™ color printer; other examples include those produced by Canon, Ricoh, Oce, Minolta, and AB Dick, as well as other models by Xerox. In general, images may be printed upon label sheets by printing devices commonly used in the home or office. For the purposes of this description, the term "office printing machine" includes any printing apparatus (both color and black-and-white) that is not normally used for commercial printing purposes, for example, inkjet printers, laser printers, photocopiers, digital printers, and so on.

Exemplary photocube 50 may be preconstructed with blocks 52 already attached as described above, or user may construct the photocube by applying at least the double labels 64 (and 88) to individual blocks as described herein. Accordingly, the photocube 50 may include a plurality of individual blocks each with a plurality of sides to which labels are attached to render the cube foldable in a plurality of configurations. In addition to the cube configuration shown in the drawings, photocube 50 may be configured as other three-dimensional shapes such as, for example, triangular or pyramid shaped, rectangular, spherical, and trapezoidal, to name a few possible configurations.

Figure 14B:
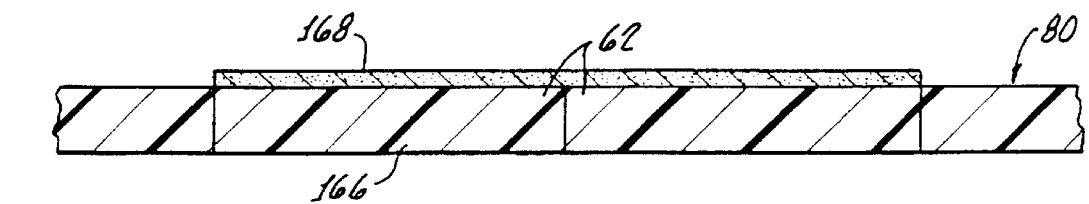
FIG. 14B is a cross-sectional view of a label sheet taken along line 14—14 of FIG. 9A, illustrating an alternative embodiment of the label sheet.

An alternative cross section of label sheet 80 (and 82) is shown in FIG. 14B. In this embodiment, the label sheets 80 and 82 include a transparent cover sheet 166 and a layer of printable adhesive 168. The image may be printed directly through adhesive 168 as shown by the arrow. The adhesive 168 may be a "cohesive" adhesive which is only adherent to a complementary adhesive which may be applied to each block 52 of photocube 50. Such cohesive adhesives are known, such as those used on airport luggage tags. Rather than using adhesive to mount the labels 86 and 88 to the photocube 50, other attaching means such as hook-and-eye fasteners (e.g., Velcro®) may be used. Alternatively, any number of the sides 53 of each block 52 may have a sleeve formed by a transparent sheet of material in which an adhesiveless label may be inserted. In this sleeved-block embodiment, the user may print on regular paper and either cut the paper or tear the paper along pre-formed perforations to slide in the sleeves.

In a commercial embodiment of the present invention, a customizing kit to be sold as a single package may include a photocube 50 (either pre-constructed or consisting of individual blocks 52 to be constructed by the user), a set of the label sheets 80 and 82, and a storage medium 26 or 28 on which is stored a plurality of computer-readable instructions for configuring the computer 12 to operate in accordance with the above description. The kit may also include any number of digital images stored on the storage media, for example, various action images of a famous athlete or entertainer or a professional sports franchise.

Those skilled in the art will understand that the preceding exemplary embodiments of the present invention provide the foundation for numerous alternatives and modifications thereto. For example, the label panels 84 and 94 may be applied to the blocks without printing any images on the labels 86 and 88. Accordingly, a user may then draw images onto the blank labels. In such an embodiment, the labels may have a vinyl-like surface to be erasable. These other modifications are also within the scope of the present invention. Accordingly, the present invention is not limited to that precisely as shown and described above.

What is claimed is:

1. A customizable configurable photocube system for use with an office printing machine, said system comprising:
   a plurality of blocks each having a plurality of sides; and
   a label sheet configured to be printed upon in an office printing machine, said label sheet including a label for attaching to one of said sides of one of said blocks and to one of said sides of another one of said blocks so that said blocks to which said label is attached are pivotal with respect to each other at said label.

2. A system as claimed in claim 1 wherein said label sheet includes a plurality of labels.

3. A system as claimed in claim 2 wherein said plurality of labels includes labels attachable to a single one of said sides of one of said blocks.

4. A system as claimed in claim 2 wherein said plurality of labels are grouped into a plurality of label panels;
   each of said label panels being attachable to a plurality of substantially coplanar said sides.

5. A system as claimed in claim 4 wherein each of said label panels corresponds to a particular set of sides of said blocks.

6. A system as claimed in claim 4 wherein said labels of each of said label panels are connected by breakable ties.

7. A system as claimed in claim 1 wherein said label sheet includes a printing sheet, a backing sheet, and adhesive disposed between said printing sheet and said backing sheet.

8. A system as claimed in claim 7 wherein said adhesive is pressure-sensitive adhesive.

9. A system as claimed in claim 1 further comprising a template sheet including a matrix corresponding in spatial position to said label of said label sheet.

10. A system as claimed in claim 1 further comprising a plurality of computer-readable instructions for causing a computer to print on the office printing machine at least a portion of a image on said label.

11. A system as claimed in claim 10 wherein said plurality of computer-readable instructions causes a computer to print on the office printing machine in accordance with the following steps:
   receiving a digitized image;
   displaying a graphical user interface including a template to said label;
   assigning at least a portion of said image to said template; and
   printing said assigned portion of said image on said label.

12. A system as claimed in claim 11 wherein said plurality of computer-readable instructions are stored on a computer-readable medium.

13. A system as claimed in claim 1 wherein each said block is attached to two other said blocks along non-adjacent edges which are orthogonal with respect to each other, said attached edges defining joints that act as hinges.

14. A system as claimed in claim 1 wherein said plurality of said blocks includes eight said blocks each having six sides.

15. A system for customizing configurable photocube, comprising:
   a plurality of blocks each having a plurality of sides;
   a label sheet configured to be printed upon in an office printing machine, said label sheet including a label for attaching to one of said sides of one of said blocks and to one of said sides of another one of said blocks so that said blocks to which said label is attached are pivotal with respect to each other at said label; and
   an office printing machine for receiving said label sheet and printing upon said label.

16. A system as claimed in claim 15 wherein said office printing machine is a printer connectable to a computer.

17. A system as claimed in claim 16 further comprising:
   a monitor;
   an interface device; and
   a computer connected to said monitor, said interface device, and said printer, said computer for:
   receiving a digitized image;
   displaying said image on said monitor;
   displaying a graphical user interface including information corresponding to said label sheet on said monitor;
   displaying a signal from said interface device assigning at least a portion of said image to said label; and
   causing said printer to print said assigned portion of said image on said label of said label sheet.

18. A system as claimed in claim 15 wherein said office printing machine is a photocopier.

* * * * *